United States Patent
Bhatti et al.

(10) Patent No.: US 7,654,307 B2
(45) Date of Patent: Feb. 2, 2010

(54) EVAPORATIVE COOLER ASSISTED AUTOMOTIVE AIR CONDITIONING SYSTEM

(75) Inventors: Mohinder Singh Bhatti, Amherst, NY (US); Ilya Reyzin, Williamsville, NY (US); Kurt Dale Hollasch, Pendelton, NY (US)

(73) Assignee: Delphi Technologies, Inc., Troy, MI (US)

( * ) Notice: Subject to any disclaimer, the term of this patent is extended or adjusted under 35 U.S.C. 154(b) by 736 days.

(21) Appl. No.: 11/333,904

(22) Filed: Jan. 18, 2006

(65) Prior Publication Data

US 2007/0163772 A1    Jul. 19, 2007

(51) Int. Cl.
F25B 29/00     (2006.01)
B60H 1/32      (2006.01)
B60H 1/24      (2006.01)

(52) U.S. Cl. .............................. 165/42; 165/43; 165/59; 165/60; 62/91; 62/314; 62/315; 62/316; 62/288; 62/291; 62/92; 62/95; 62/96; 261/153; 261/154; 261/156

(58) Field of Classification Search ................. 165/202, 165/42, 43, 59, 60; 62/91, 314–316, 288, 62/291, 92, 95, 96; 261/153, 154, 156
See application file for complete search history.

(56) References Cited

U.S. PATENT DOCUMENTS

| | | | | |
|---|---|---|---|---|
| 2,259,541 A | * | 10/1941 | Ballard | .......................... 62/305 |
| 4,002,040 A | | 1/1977 | Munters et al. | ................ 62/121 |
| 5,453,223 A | | 9/1995 | Maisotsenko | |
| 6,497,107 B2 | | 12/2002 | Maisotsenko | ................ 62/121 |
| 6,581,402 B2 | | 6/2003 | Maisotsenko | ................ 62/121 |
| 6,705,096 B2 | | 3/2004 | Maisotsenko | ................ 62/121 |
| 2002/0078704 A1 | | 6/2002 | Stich | |

FOREIGN PATENT DOCUMENTS

| | | | |
|---|---|---|---|
| DE | 19613684 | | 5/1996 |
| JP | 57065525 A | * | 4/1982 |
| JP | 60245940 A | * | 12/1985 |
| JP | 04159125 A | * | 6/1992 |
| JP | 06143988 A | * | 5/1994 |

* cited by examiner

*Primary Examiner*—John K Ford
(74) *Attorney, Agent, or Firm*—Patrick M. Griffin

(57) ABSTRACT

An automotive air conditioning system is disclosed comprising an evaporative cooler in series with the conventional vapor compression system. The evaporative cooler comprises an array of dry channels and a contiguous array of wet channels. The primary air stream to be conditioned by the evaporator of the conventional air conditioning system is preconditioned by the evaporative cooler by lowering its dry bulb temperature without changing its absolute humidity. An evaporator core is supported downstream of the evaporative cooler for receiving the primary air from the dry channels and thereby produces liquid condensate. The system is distinguished by conducting the liquid condensate from the evaporator core to the wicking tank for use in the wet channels of the evaporative cooler.

10 Claims, 4 Drawing Sheets

EVAPORATIVE COOLER ASSISTED AUTOMOTIVE AIR CONDITIONING SYSTEM

BACKGROUND OF THE INVENTION

1. Field of the Invention

The invention relates to an automotive heating, venting and air conditioning (HVAC) system and, more specifically, to a vapor compression air conditioning system augmented by an evaporative cooler operating in series with the air conditioning system.

2. Description of the Prior Art

The HVAC system to which the subject invention pertains includes a housing with an evaporative cooler supported in the housing upstream of an evaporator core for receiving primary air from dry channels of the evaporative cooler, which also defines a plurality of wet channels extending transversely to the dry channels for receiving secondary air. A wicking tank is disposed under the wet channels for containing liquid and a wicking material is disposed in the wet channels for drawing liquid from the wicking tank into the wet channels. A reservoir is supported by the housing for collecting liquid condensate from the evaporator core.

A prime function of the automotive air conditioning system is to supply properly conditioned air to the passenger compartment of the vehicle. The conditioned air is obtained by reducing the dry bulb temperature of the moisture-laden hot air admitted into the air conditioning system. When such an air stream flows through the air conditioning system, there is transfer of both sensed or sensible heat (sensed by a thermometer) and latent heat (hidden and not sensed by the thermometer). The air conditioning system thus conditions the air by cooling it in response to the sensed heat and additionally by removing moisture therefrom. The removal of moisture from air occurs exothermally which means that the moisture is condensed from the moist air as its dry bulb temperature increases. The temperature of the air rises about 0.75° F. for each grain of moisture (1 grain=0.000143 $lb_m$) condensed therefrom. Thus, the air conditioning load has two distinct components: sensed or sensible load due to cooling alone (i.e., drop in dry bulb temperature) and latent load due to moisture removal from air with concurrent rise in its dry bulb temperature. The evaporative cooling system is best suited for sensible load reduction.

The evaporative cooling system employs two separate airstreams—primary and secondary. The primary air flows through the dry channels of the evaporative cooler while the secondary air flows through the wet channels of the evaporative cooler. The wet channels are lined with a wicking material, which holds liquid water for evaporation. The heat required for evaporation is abstracted from the primary air stream flowing in the contiguous dry channels. Thus, the liquid water evaporating in the wet channels lowers the dry bulb temperature of the primary air in the dry channels.

The two principal methods of evaporative cooling are direct evaporative cooling and indirect evaporative cooling. A variant of the indirect evaporative cooling method, called staged indirect evaporative cooling, has also found applications in recent years as described in the U.S. Pat. No. 5,453,223 to Maisotsenko; U.S. Pat. Nos. 6,497,107; 6,581,402 and 6,705,096 to Maisotsenko et al.

In the direct evaporative cooling method, there are no dry channels so that the primary air flows through the wet channels. During its passage through the wet channels, the dry bulb temperature of the primary air decreases while its absolute humidity increases due to vaporizing liquid water in the wet channels. However, a decrease in the dry bulb temperature is desired to result in lower sensible air conditioning load, as an increase in the absolute humidity is undesired to result in higher air conditioning load. Thus, direct evaporative cooling is counterproductive to some extent.

In the indirect evaporative cooling method, the primary air flows through the dry channels and the secondary air through the wet channels. The two air streams do not come in direct contact with each other so as to keep the absolute humidity of the primary air at its initial level. However, the absolute humidity of the secondary air increases as it flows through the wet channel due to the vaporization of the liquid water on the wet channel walls, as carried by the wicking material. As a result, the temperature of the wet channel wall is lowered. The primary air flowing through the dry channels tends to assume the temperature of the cooled wet channel walls without absorbing any moisture and thereby maintaining its absolute humidity at the original level. It becomes apparent that, in indirect evaporative cooling, the primary air is cooled sensibly with a heat exchange through the walls of the dry channels as secondary air flowing through the wet channels carries away the heat extracted from the primary air stream.

In the staged indirect evaporative cooling method, the primary air flows through the dry channels and the secondary air through the wet channels. As the primary air flows through the dry channels, small fractions of it are bled into the wet channel in multiple stages. The process of staged bleeding of the primary air into the secondary air stream flowing through the wet channels greatly increases the efficiency of the evaporative cooler. Whereas the conventional direct and indirect evaporative coolers can lower the dry bulb temperature of the primary air stream to within five to thirty percent (5% to 30%) of the wet bulb temperature of the air, the staged indirect evaporative cooler is capable of lowering the dry bulb temperature of the primary air stream up to twenty two percent (22%) below the wet bulb temperature and to within fifteen percent (15%) of the dew point temperature.

Direct and indirect evaporative cooling methods can be combined into compound evaporative cooling method. Another type of evaporative cooling method is the desiccant-assisted cooling method wherein the air cooled by evaporation is dehumidified by means of a regenerative desiccant material in order to increase its comfort cooling capacity, as described in the U.S. Pat. No. 4,002,040 to Munters et al. In this method, regeneration by heating the desiccant material is necessary to drive off the water absorbed by the desiccant material during dehumidification. The evaporative cooling method can also be used in conjunction with other methods of cooling, such as the vapor compression cooling. It is such an evaporation-assisted vapor compression cooling in a motor vehicle to which the subject invention pertains.

SUMMARY OF THE INVENTION AND ADVANTAGES

The invention provides for a reservoir wick extending from the reservoir to the wicking tank for conducting liquid condensate from the reservoir to the wicking tank.

The subject invention relates to an automotive air conditioning system including an evaporative cooler in series with the conventional vapor compression system. The purpose of the evaporative cooler is to reduce the sensible heat portion of the air conditioning load handled by the vapor compression air conditioning system. The primary air stream to be conditioned by the evaporator core of the conventional air conditioning system is preconditioned by the evaporative cooler by lowering its dry bulb temperature. During its passage through the evaporative cooler, a fraction of the primary air stream is diverted to the wet channels lined with a water-soaked wicking material. This secondary air stream flowing through the wet channels causes evaporation of the water in the wet channel thereby lowering the temperature of the wet channel walls and thus cooling the primary air stream flowing through the contiguous dry channels. The liquid water required for evaporation is derived from various sources including water condensed from the primary air by the evaporator core of the vapor compression system. A separate provision may be included for water addition when the air conditioning system operates under extremely dry climatic conditions. Under most climatic conditions, the evaporation-assisted air conditioning system is capable of operating without separate water addition.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
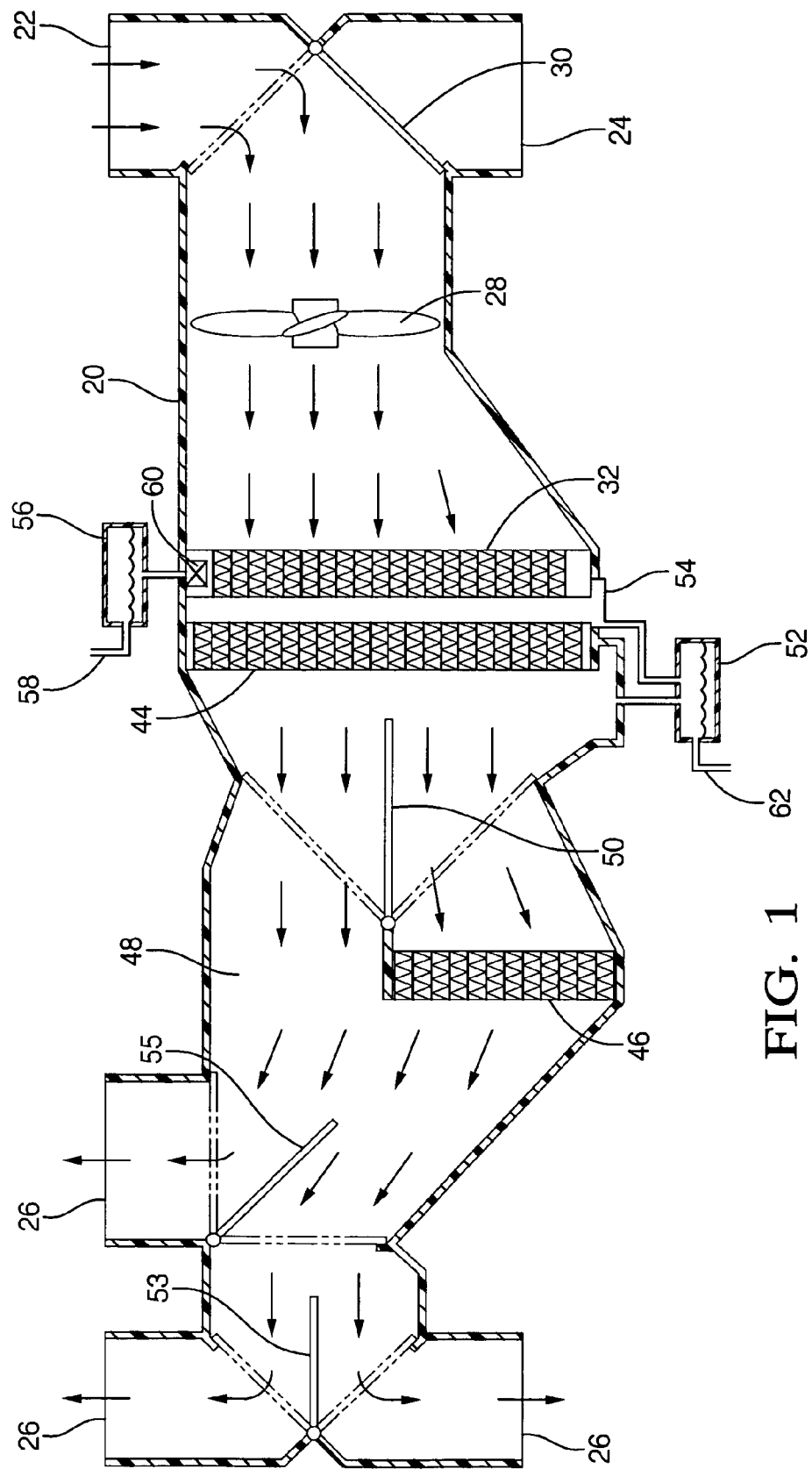
FIG. 1 is a schematic of a heating and ventilating and air conditioning (HVAC) system of the type used in an automotive vehicle to condition the air for the passenger compartment.

A heating and ventilating and air conditioning (HVAC) system is illustrated schematically in FIG. 1 and includes a housing 20 presenting an outside air inlet 22 for drawing in outside air and a re-circulated air inlet 24 for drawing in recirculated air from the compartment of an automotive vehicle. The housing 20 also presents conditioned air outlets 26 for proportioning primary air into the compartment of an automotive vehicle, e.g., a vent outlet, a defrost outlet, and/or heater outlet.

A blower 28 is supported in the housing 20 for moving air through the housing 20. An air inlet valve 30 is supported in the housing 20 downstream of the air inlets 22, 24 for proportioning outside air and recirculated air into a mixture of primary air.

An evaporative cooler 32 is supported in the housing 20 and defines a plurality of horizontal dry channels for receiving the primary air and a plurality of vertical wet channels extending transversely to the dry channels for receiving secondary air. The wet channels are defined by a plurality of vertically extending boxes 34 spaced laterally from one another by the dry channels and each having a rectangular cross section open at top and bottom ends and a plurality of spaced dividers 35 to define the plurality of wet channels. The dry channels are defined by a plurality of panels 36 disposed in a zig zag arrangement between adjacent boxes 34 and extending transversely to the wet channels. The panels 36 include louver-fins 38 for enhancing heat transfer. The heat transfer surface of the dry channels is enhanced by an array of convoluted louver-fins 38 or fins extending between the dry channel walls. The walls of the boxes 34 define passages 40 for conducting bleed air from the dry channels to the wet channels.

A wicking tank 42 is disposed under the bottom ends of the wet channels for containing liquid. A wicking material is disposed on the interior walls in the wet channels for drawing liquid from the wicking tank 42 into the wet channels.

An evaporator core 44 is supported in the housing 20 downstream of the evaporative cooler 32 for receiving the primary air from the dry channels. A heater core 46 is supported in the housing 20 downstream of the evaporator core 44 for receiving and heating primary air from the evaporator core 44.

The housing 20 defines a by-pass 48 for conducting primary air flow from the evaporator core 44 around the heater core 46 to the conditioned air outlets 26. A temperature valve 50 is supported by the housing 20 for proportioning the primary air from the evaporator core 44 between the heater core 46 and the by-pass 48.

A reservoir 52 is supported by the housing 20 for collecting liquid condensate from the evaporator core 44. A reservoir wick 54 extends from the reservoir 52 to the wicking tank 42 for conducting liquid condensate from the reservoir 52 to the wicking tank 42. A sheath made of metal surrounds the reservoir wick 54 between the reservoir 52 and the wicking tank 42.

The invention also provides a method of operating a heating and ventilating and air conditioning (HVAC) system of the type including an evaporative cooler 32 defining a plurality of horizontal dry channels for receiving primary air and a plurality of vertical wet channels extending transversely to the dry channels for receiving secondary air, an evaporator core 44 supported downstream of the evaporative cooler 32 for receiving the primary air from the dry channels and producing liquid condensate, a wicking tank 42 disposed under the bottom ends of the wet channels for containing liquid, a wicking material disposed in the wet channels for drawing liquid from the wicking tank 42 into the wet channels, with the method distinguished by conducting liquid condensate from the evaporator core 44 to the wicking tank 42 for use in the wet channels of the evaporative cooler 32.

The outside air is drawn into the HVAC module through the outside air inlet 22 and the re-circulated air is drawn into the HVAC module through the re-circulated air inlet 24 as the AC blower 28 provides propulsive power for the drawing the outside air and the re-circulated air into the HVAC module. The setting of the AC blower 28 in conjunction with the position of the air inlet valve 30 determines the blending or mixing of the fractions of the outside air and re-circulated air drawn into the HVAC module by the blower 28.

The primary air stream, indicated by the bold arrows, is forced to pass through the dry channels of the evaporative cooler 32, the construction and operation of which is best understood by referring to FIGS. 2 through 5. A fraction of the primary air stream is drawn into the wet channels of the evaporative cooler 32 through the openings provided in the walls of the dry channels. As recited above, the walls of the wet channels are lined with a wicking material to draw liquid water by capillary action from the wicking tank 42 at the bottom of the evaporative cooler 32. The liquid water for the wicking tank 42 of the evaporative cooler 32 could be provided from several sources, including a separate water container 56, which could be re-filled from an outside supply or from rainwater collected at the windshield through a water inlet 58. A float valve 60 is provided between the water container 56 and the wicking tank 42 of the evaporative cooler 32 to regulate the amount of water entering the wicking tank 42.

However, the subject invention supplies liquid water for the wicking tank 42 of the evaporative cooler 32 from the condensate reservoir 52, which collects water condensate removed from the primary air stream by the evaporator core 44 located downstream of the evaporative cooler 32. The condensate reservoir 52 is provided with a condensate overflow 62 to prevent the liquid water from overflowing the condensate reservoir and collecting directly beneath the evaporative cooler 32. The liquid water overflow 62 can be advantageously used in two distinct ways; the overflow water can be drawn to the condenser surface where evaporation of the liquid water can enhance effectiveness of the condenser, and it can also be atomized into the air stream flowing over the radiator and condenser thereby improving heat transfer through these heat exchangers.

A stagnant pool of water beneath the evaporator core 44 is prone to produce growth of certain microorganism, which produces a malodor in the primary air stream. Accordingly, the condensate reservoir 52 is provided with a sheathed wick, which draws water by capillary action from the condensate reservoir 52 to the wicking tank 42 at the bottom of the evaporative cooler 32. The wick is preferably sheathed with a metal foil, which prevents growth of odor producing microorganism on the material of the wick. Any growth of the odor-producing microorganism occurring on the wick is not as serious as the growth of the microorganism occurring directly beneath the evaporator core 44. This is because the microorganism growing beneath the evaporator core 44 can easily get air borne in the primary air stream, which enters the passenger compartment. Any microorganism growing on the wick can get air borne in the secondary air stream flowing through the wet channels of the evaporative cooler 32. However, since the secondary air stream, unlike the primary air stream, does not enter the passenger compartment, the odor-producing microorganism in the secondary air stream does not pose a concern from the standpoint of evaporator odor.

The primary air stream flows through the dry channels with an array of convoluted louver-fins 38 or louvered for heat transfer enhancement as the air flows to the evaporator core 44. The secondary air, on the other hand, flows through the boxes 34 divided into an array of wet channels of appropriate hydraulic diameter. The only fluidic communication between the dry channels and the wet channels is through the openings intended to admit a fraction of the incoming primary air into the wet channels.

Figure 2:
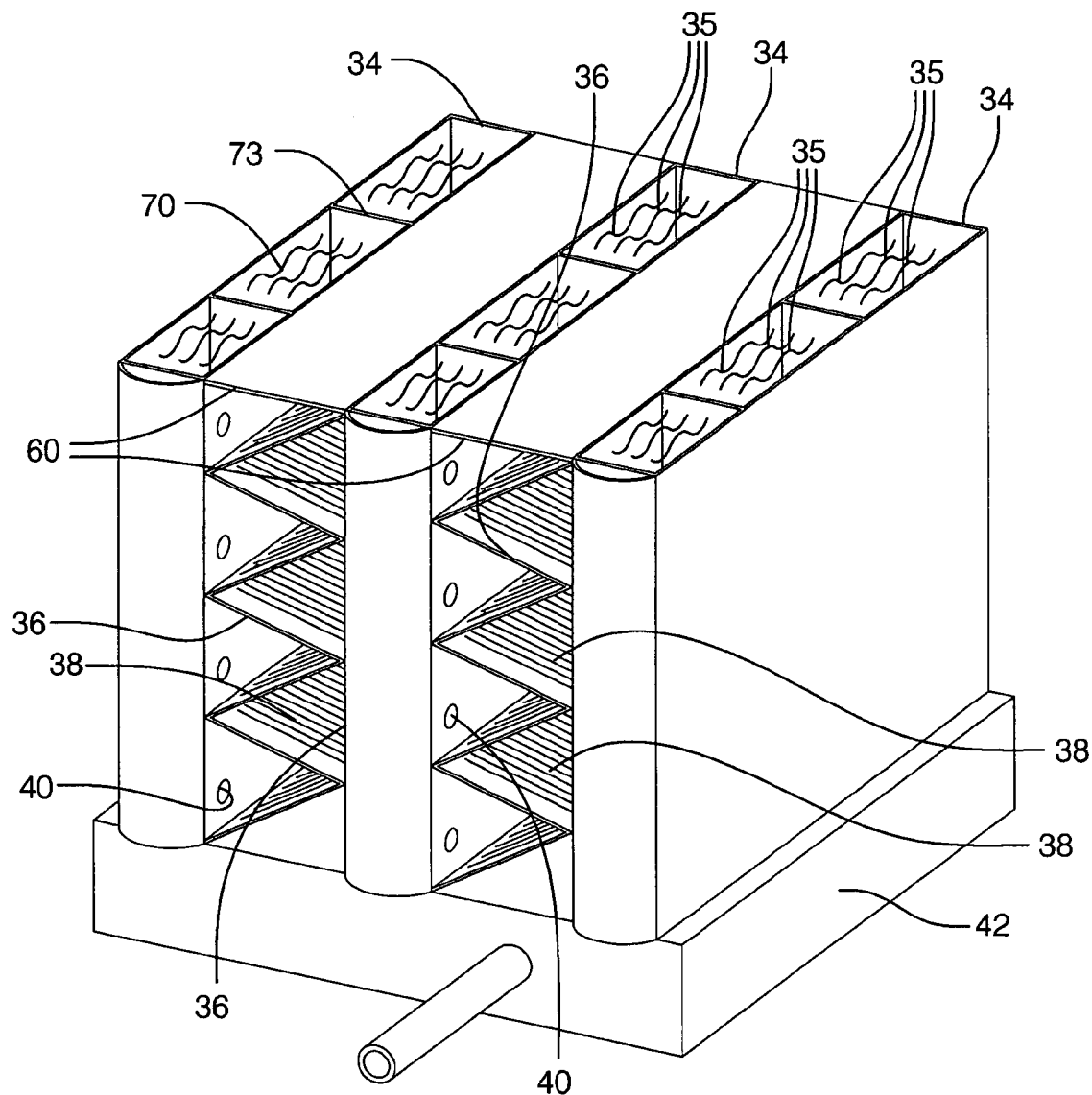
FIG. 2 shows a first embodiment of the evaporative cooler with straight rectangular flow passages of uniform width for the secondary air stream.
Figure 3:
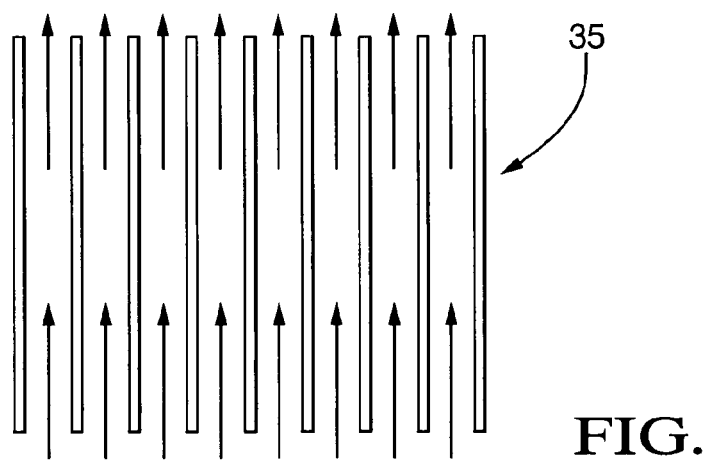
FIG. 3 shows the first embodiment of the evaporative cooler with straight rectangular flow passages of uniform width for the secondary air stream.
Figure 4:
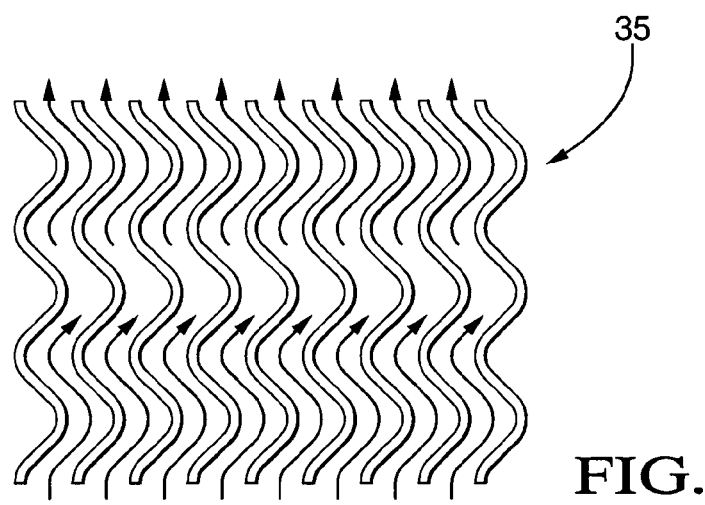
FIG. 4 shows a second embodiment of the evaporative cooler with zigzag flow passages of uniform width for the secondary air stream.
Figure 5:
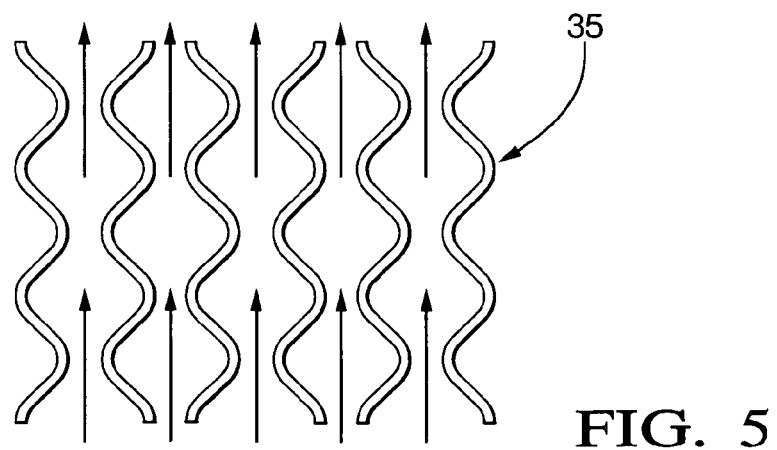
FIG. 5 shows a third embodiment of the evaporative cooler with zigzag flow passages of non-uniform width for the secondary air stream.

The rate of evaporation of liquid water in the wet channels is augmented by the flow passages 40 with varying cross sectional area in the flow direction. The cross sectional shape of the wet channels in the first embodiment of FIGS. 2 and 3 is rectangular or straight; however, the dividers 35 in the dry channels may be undulated between the open ends for defining a tortuous flow path to augment the rate of evaporation. In the second embodiment of the evaporative cooler 32 shown in FIG. 4, the wet channels are nonrectangular but of uniform width with zigzag dividers 35; i.e., the undulated dividers 35 are constantly spaced along the undulations thereof to present a flow path of uniform cross section. The resulting zigzag passages 40 provide slightly tortuous paths with more surface area for evaporation of the liquid water. In the third embodiment of the evaporative cooler 32 shown in FIG. 5, the wet channels are non-rectangular of non-uniform width with zigzag walls; i.e., the undulated dividers 35 are unevenly spaced along the undulations thereof to present a flow path of varying cross section. Not only do the resulting zigzag passages 40 provide more surface area for evaporation of the liquid water, the passages 40 additionally promote turbulence in the secondary air stream due to periodic changes in the flow area cross section in the direction of the secondary airflow. The turbulence in the secondary air stream enhances the evaporative cooling within the wet channels.

As shown in FIG. 1, the evaporator-conditioned primary air can be directed through the heater core 46 depending on the position of the temperature valve 50. Furthermore, a fraction of the primary air leaving the evaporator core 44 can be sent through one of the conditioned air outlets 26 and into the passenger compartment. A vent valve 55 regulates or proportions the vented fraction of the air between a first upwardly extending vent outlet or downstream outlets, including a second upwardly extending defrost outlet and a downwardly extending heater outlet. A downstream heater-defroster valve 53 divides the air flow between the defrost outlet and the heater outlet.

From an operational point of view, the preconditioning of the primary air stream through the evaporative cooler 32 entails lowering of its dry bulb temperature without lowering its humidity. The minimum temperature that the primary air can attain in the dry channels of the evaporative cooler 32 is the dew point temperature corresponding to the initial absolute humidity of the primary air admitted into the evaporative cooler 32. The preconditioned primary air with lower dry bulb temperature enters the evaporator core 44, which further lowers its dry bulb temperature. More importantly, the evaporator core 44 lowers the absolute humidity of the primary air thereby conditioning it completely.

The dry bulb temperature of the secondary air flowing through the wet channels of the evaporative cooler 32 remains unchanged. However, its absolute humidity increases due to evaporation of the liquid water in the wet channels. The moisture-laden secondary air can be advantageously used by forcing it through a humid air discharge over the condenser of the air conditioning system improving its effectiveness and thereby enhancing coefficient of performance of the air conditioning system.

Figure 6:
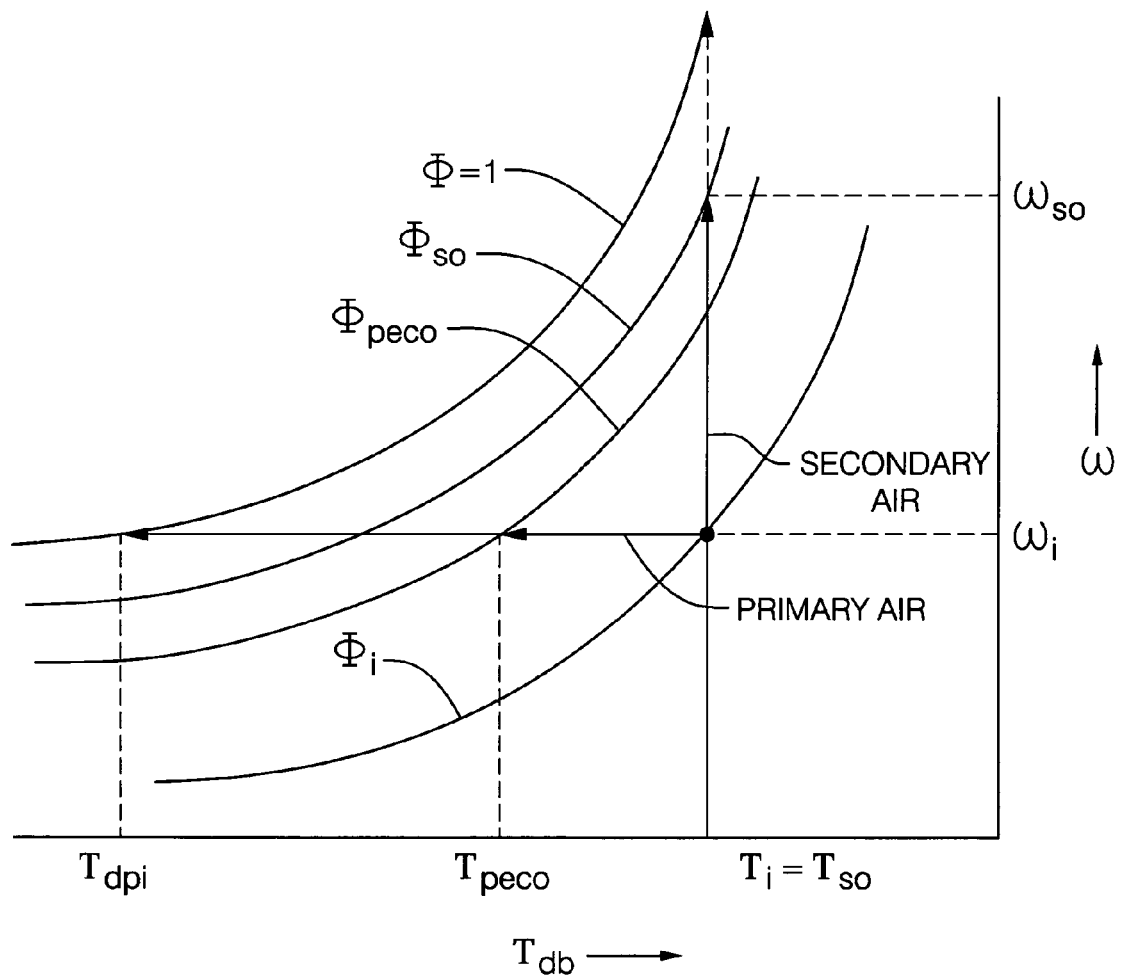
FIG. 6 is a representation of the primary and secondary airstreams on the psychrometric chart.

The thermodynamic states of the primary air and secondary air during their passage 40 through the evaporative cooler 32 are depicted in FIG. 6. The horizontal axis of the psychrometric chart represents the dry bulb temperature $T_{db}$ of the moist air with $T_{dpi}$ representing the dew point temperature of the air corresponding to the absolute humidity of the incoming primary air, $T_{peco}$ representing the dry bulb temperature of the primary air leaving the evaporative cooler 32, $T_{so}$, representing the dry bulb temperature of the secondary air leaving the evaporative cooler 32 and $T_i$ representing the dry bulb temperature of the incoming primary air into the evaporative cooler 32. The vertical axis of the psychrometric chart represents the absolute humidity ω of the moist air with $ω_i$ representing the absolute humidity of the incoming moist air into the evaporative cooler 32 and $ω_{so}$ representing the absolute humidity of the secondary air leaving the evaporative cooler 32. The curved lines are parameterized by the relative humidity Φ with Φ=1 representing the saturated air, $Φ_{so}$ representing the relative humidity of the secondary air as it leaves the evaporative cooler 32, $Φ_{peco}$ representing the relative humidity of the primary air leaving the evaporative cooler 32, and $Φ_i$ representing the relative humidity of the incoming air into the evaporative cooler 32.

It is clear from FIG. 6 that the absolute humidity $ω_{peco}$ of the primary air as it leaves the evaporative cooler 32 is the same as the absolute humidity $ω_i$ of the incoming air since there is no water vapor generated in the dry channels of the evaporative cooler 32. However, the relative humidity $Φ_{peco}$ of the primary air as it leaves the evaporative cooler 32 is greater than the relative humidity $\Phi_i$ of the incoming air. Depending on the size of the evaporative cooler 32, the primary air leaving the evaporative cooler 32 can become saturated with water vapor, i.e., $\Phi_{peco} \to 1$ due to drop in the dry bulb temperature at fixed absolute humidity. As regards the dry bulb temperature $T_{peco}$ of the primary air, it drops below the incoming air dry bulb temperature $T_i$ due to sensible heat transfer at the channel walls cooled by the vaporizing liquid water on the opposite side of the walls forming the wet channels, i.e., $T_{peco} < T_i$. Depending on the size of the evaporative cooler 32 the dry bulb temperature of the primary air can approach the dew point temperature corresponding to initial conditions of the incoming air, i.e., $T_{peco} \to T_{dpi}$.

It is also clear from FIG. 6 that the absolute humidity $\omega_{so}$ of the secondary air as it leaves the evaporative cooler 32 is greater than the absolute humidity $\omega_i$ of the incoming air due to water vapor generated in the wet channels of the evaporative cooler 32. However, the relative humidity $\Phi_{so}$ of the secondary air as it leaves the evaporative cooler 32 is greater than the relative humidity $\Phi_i$ of the incoming air. Depending on the size of the evaporative cooler 32, the secondary air leaving the evaporative cooler 32 can become saturated with water vapor, i.e., $\Phi_{so} \to 1$ due to moisture absorption at fixed dry bulb temperature. As regards the dry bulb temperature $T_{so}$ of the secondary air, it remains unchanged at the level of the dry bulb temperature of the incoming air $T_i$, i.e., $T_{so} = T_i$.

As explained above, the evaporative cooler 32 is intended to cool the incoming moist air close to the dew point temperature $T_{dpi}$ without removing any moisture from the primary air. This cooling of the primary air is achieved by the evaporation of the liquid water in the wet channels by the secondary air, which does not come in direct contact with the primary air. The liquid water for evaporation in the wet channels can be provided partly or wholly from the container 56, which is supplied from an external source, or it can be provided partially or wholly from the condensate reservoir, which stores the water removed by the evaporator core 44 of the vapor compression system located downstream of the evaporative cooler 32.

Table I presents relative magnitudes of the rate of generation of liquid water $M_{wevap}$ by the evaporator core 44 and the rate of consumption of water $M_{wec}$ by the evaporative cooler 32 under various climatic conditions under which an automotive air conditioning system operates. The tabular results correspond to an air conditioning system delivering 17.25 $lb_m$/min of conditioned air into the passenger compartment of a motor vehicle with one hundred percent (100%) relative humidity and fifty degrees Fahrenheit (50° F.) dry bulb temperature. The dry bulb temperature $T_i$ and the relative humidity $\Phi_i$ of the incoming primary air under various climate conditions are indicated in Table I.

TABLE I

Relative magnitudes of the rate of generation of liquid water $M_{wec}$ by the evaporator core 44 and the rate of consumption of water $M_{wevap}$ by the evaporative cooler 32 under various climatic conditions.

| Climatic conditions | Locale | $T_i$ ° F. | $\Phi_i$ | $M_{wevap}/M_{wec}$ |
|---|---|---|---|---|
| Very hot and dry | Sahara Desert | 120 | 0.05 | 0.00 |
| Arid | Phoenix, AZ | 105 | 0.20 | 0.25 |
| Normal | Most of USA | 100 | 0.40 | 1.86 |
| Hot and humid | Miami, FL | 89 | 0.65 | 5.22 |
| Hot and very humid | Padre Island, TX | 90 | 0.90 | 34.10 |

The last column in Table I shows that under very hot and dry as well as under arid conditions, the rate of generation of liquid water $M_{wevap}$ by the evaporator core 44 is inadequate to sustain the operation of the evaporative cooler 32 requiring the use of make up water from an external source. Under all other climatic conditions, the evaporator core 44 generates more than enough liquid water to operate the evaporative cooler 32.

Use of the evaporative cooler 32 in conjunction with the vapor compression air conditioning systems reduces the sensible air conditioning load of the system leaving the latent load of the air conditioning system unchanged. Table II presents the results indicating reduction in the total air conditioning load due to the evaporative cooler 32 operating in series with the vapor compression system under the aforementioned operating conditions and various climatic conditions indicated in Table I. The second column of Table II lists the values of the sensible cooling $Q_{senec}$ produced by the evaporative cooler 32, the third column lists the values of the sensible cooling $Q_{sen}$ produced by the evaporator core 44, the fourth column lists the values of the latent cooling $Q_{lat}$ produced by the evaporator core 44, the fifth column lists the values of the total cooling $Q_{tot}$ produced by the evaporative cooler 32 and the evaporator core 44, and the sixth column lists the ratio $Q_{senec}/Q_{tot}$ of the sensible cooling produced by the evaporative cooler 32 to the total cooling produced by the air conditioning system comprising the evaporative cooler 32 operating in conjunction with the evaporator core 44.

TABLE II

Reduction in the total air conditioning load $Q_{tot}$ due to sensible cooling $Q_{senec}$ produced by the evaporative cooler 32 under various climatic conditions.

| Climatic conditions | $Q_{senec}$ BTU/min | $Q_{sen}$ BTU/min | $Q_{lat}$ BTU/min | $Q_{tot}$ BTU/min | $Q_{senec}/Q_{lat}$ |
|---|---|---|---|---|---|
| Very hot and dry | 290 | 0 | 0 | 290 | 1.00 |
| Arid | 185 | 43 | 40 | 268 | 0.69 |
| Normal | 117 | 90 | 175 | 382 | 0.31 |
| Hot and humid | 55 | 107 | 228 | 390 | 0.14 |
| Hot and very humid | 14 | 152 | 390 | 556 | 0.03 |

The results in Table II show that the evaporative cooler 32 reduces the air conditioning load under all climatic conditions ranging from a value of three percent (3%) under hot and very humid conditions to a high value of one hundred percent (100%) under very hot and dry conditions, the load reductions values for the arid, normal and hot and humid conditions being sixty nine percent (69%), thirty one percent (31%) and fourteen percent (14%), respectively. Also it may be noted from the results in Table II that all the load reduction is attributable to reduction in the sensible load due to the evaporative cooler 32.

Obviously, many modifications and variations of the present invention are possible in light of the above teachings. The invention may be practiced otherwise than as specifically described within the scope of the appended.

What is claimed is:

1. A heating and ventilating and air conditioning (HVAC) system comprising:
   housing,
   an evaporative cooler supported in said housing and defining a plurality of horizontal dry channels for receiving primary air and a plurality of vertical wet channels extending transversely to said dry channels for receiving secondary air, an evaporator core supported in said housing downstream of said evaporative cooler for receiving the primary air from said dry channels, a wicking tank disposed under said bottom ends of said wet channels for containing liquid, a wicking material disposed in said wet channels for drawing liquid from said wicking tank into said wet channels, a reservoir supported by said housing for collecting liquid condensate from said evaporator core, and a reservoir wick extending from said reservoir to said wicking tank for conducting liquid condensate from said reservoir to said wicking tank.

2. A system as set forth in claim 1 including a sheath made of metal and surrounding said reservoir wick between said reservoir and said wicking tank.

3. A system as set forth in claim 2 including a plurality of vertically extending boxes defining said wet channels and being spaced laterally from one another by said dry channels and each having a rectangular cross section open at top and bottom ends, and a plurality of spaced dividers defining said plurality of wet channels, and a plurality of panels disposed in a zig zag arrangement between adjacent boxes and extending transversely to said wet channels for defining said dry channels.

4. A system as set forth in claim 3 with said dividers being undulated between said open end for defining a tortuous flow path.

5. A system as set forth in claim 4 with said undulated dividers being constantly spaced along the undulations thereof to present a flow path of uniform cross section.

6. A system as set forth in claim 4 with said undulated dividers being unevenly spaced along the undulations thereof to present a flow path of varying cross section.

7. A heating and ventilating and air conditioning system comprising:

a housing presenting an outside air inlet for drawing in outside air and a re-circulated air inlet for drawing in recirculated air from the compartment of an automotive vehicle, a blower supported in said housing for moving air through said housing, an air inlet valve supported in said housing downstream of said air inlets for proportioning outside air and recirculated air into a mixture of primary air, an evaporative cooler supported in said housing and defining a plurality of horizontal dry channels for receiving the primary air and a plurality of vertical wet channels extending transversely to said dry channels for receiving secondary air, said wet channels defined by a plurality of vertically extending boxes spaced laterally from one another by said dry channels and each having a rectangular cross section open at top and bottom ends and a plurality of spaced dividers to define said plurality of wet channels, a wicking tank disposed under said bottom ends of said wet channels for containing liquid, a wicking material disposed in said wet channels for drawing liquid from said wicking tank into said wet channels, a plurality of panels disposed in a zig zag arrangement between adjacent boxes and extending transversely to said wet channels for defining said dry channels, said panels including louver-fins for enhancing heat transfer, said boxes defining passages for conducting bleed air from said dry channels to said wet channels, an evaporator core supported in said housing downstream of said evaporative cooler for receiving the primary air from said dry channels, a heater core supported in said housing downstream of said evaporator for receiving and heating primary air from said evaporator core, said housing having conditioned air outlets for proportioning primary air into the compartment of an automotive vehicle, said housing defining a by-pass for conducting primary air flow from said evaporator core around said heater core to said conditioned air outlets, a temperature valve supported by said housing for proportioning the primary air from said evaporator core between said heater core and said by-pass, a reservoir supported by said housing for collecting liquid condensate from said evaporator core, and a reservoir wick extending from said reservoir to said wicking tank for conducting liquid condensate from said reservoir to said wicking tank, and a sheath made of metal and surrounding said reservoir wick between said reservoir and said wicking tank.

8. A system as set forth in claim 7 with said dividers being undulated between said open end for defining a tortuous flow path.

9. A system as set forth in claim 8 with said undulated dividers being constantly spaced along the undulations thereof to present a flow path of uniform cross section.

10. A system as set forth in claim 8 with said undulated dividers being unevenly spaced along the undulations thereof to present a flow path of varying cross section.

* * * * *